United States Patent [19]

Fukuda

[11] Patent Number: 4,709,275
[45] Date of Patent: Nov. 24, 1987

[54] APPARATUS FOR MAGNETICALLY RECORDING AND/OR REPRODUCING TWO-CHANNEL AUDIO SIGNALS TOGETHER WITH A COLOR VIDEO SIGNAL IN SUCCESSIVE OBLIQUE TRACKS ON A MAGNETIC TAPE

[75] Inventor: Tokuya Fukuda, Tokyo, Japan

[73] Assignee: Sony Corporation, Tokyo, Japan

[21] Appl. No.: 709,123

[22] Filed: Mar. 7, 1985

[30] Foreign Application Priority Data

Mar. 24, 1984 [JP] Japan ................................ 59-56456

[51] Int. Cl.$^4$ ............................................ H04N 5/782
[52] U.S. Cl. .................................... 358/310; 358/343; 358/330; 360/19.1
[58] Field of Search ............... 358/310, 330, 341, 343; 360/19.1

[56] References Cited

U.S. PATENT DOCUMENTS 4,477,840 10/1984 Kuth ..................................... 358/330
4,490,754 12/1984 Kluth .................................. 360/19.1
4,564,868 1/1986 Arafune ............................. 360/19.1
4,613,912 9/1986 Yoshioka et al. .................. 360/19.1

Primary Examiner—Robert L. Richardson

Attorney, Agent, or Firm—Lewis H. Eslinger; Alvin Sinderbrand

[57] ABSTRACT

In an apparatus for magnetically recording and/or reproducing two-channel audio signals and a color video signal, the color video signal is processed to provide a frequency-modulated luminance signal and a frequency-converted chrominance signal in a band below that of the frequency modulated luminance signal, and the two-channel audio signals are processed to provide a frequency-modulated audio signal including alternated first and second segments respectively corresponding to the two-channel audio signals. The frequency-modulated audio signal is mixed with, and located between the frequency bands of the frequency-modulated luminance signal and the frequency-converted chrominance signal to provide a mixed signal which is recorded in successive oblique tracks on a magnetic tape. In the reproducing mode, the luminance and chrominance signals are obtained from the frequency-modulated luminance and frequency-converted chrominance signals in the mixed signal reproduced from the magnetic tape, and the frequency-modulated audio signal obtained from the mixed signal is demodulated to alternately provide the first and second segments which are separated from each other for producing the two-channel audio signals, respectively.

7 Claims, 12 Drawing Figures

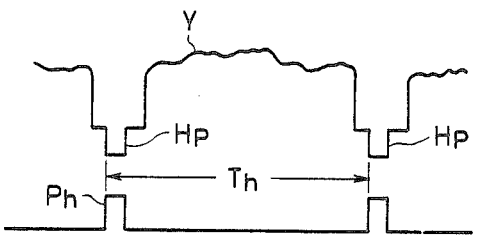
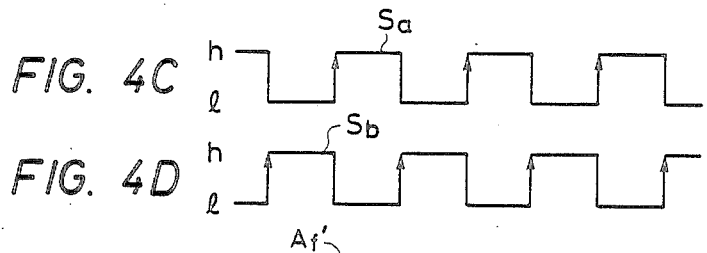
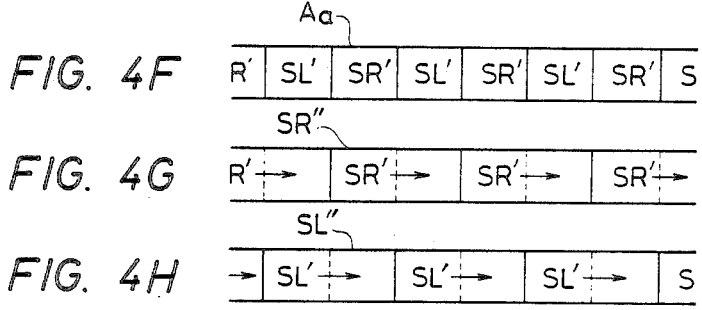
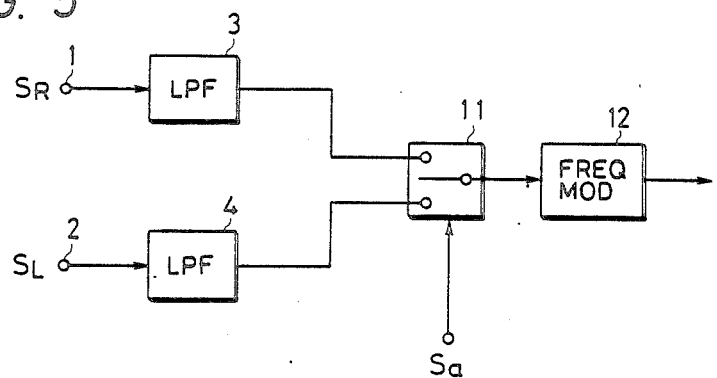

APPARATUS FOR MAGNETICALLY RECORDING AND/OR REPRODUCING TWO-CHANNEL AUDIO SIGNALS TOGETHER WITH A COLOR VIDEO SIGNAL IN SUCCESSIVE OBLIQUE TRACKS ON A MAGNETIC TAPE

BACKGROUND OF THE INVENTION

1. Field of the Invention

The present invention relates generally to an apparatus for magnetically recording and/or reproducing audio and video signals, and more particularly, is directed to a magnetic recording and/or reproducing apparatus which is operative to record and/or reproduce a frequency-modulated audio signal, together with a video signal, in oblique tracks arranged successively on a magnetic tape by means of a rotary magnetic head.

2. Description of the Prior Art

In video tape recorders generally in use when recording a color television signal on a magnetic tape, chrominance and luninance signals that constitute a color video signal are separated, and the chrominance signal is frequency-converted to have a frequency band lower than the frequency band wherein an appropriate carrier is frequency-modulated by the luminance signal so as to produce a frequency-modulated luminance signal. The frequency-converted chrominance signal and the frequency-modulated luminance signal are mixed to form a processed color video signal that is recorded through two rotary magnetic heads on the magnetic tape in successive and parallel record tracks extending obliquely with respect to the running direction of the magnetic tape. In such a system for recording a color television signal, an audio signal is recorded through a stationary magnetic head on the magnetic tape in a separate audio track extending in the running direction of the magnetic tape.

In relation to such a recording system, it has been known to restrict the speed at which the magnetic tape is transported so that the oblique tracks are positioned to be immediately adjacent to each other, that is, so that the spaces or so-called guard bands between the adjacent oblique tracks will be eliminated, in order to increase the recording density of the processed color video signal on the magnetic tape, and thereby to increase the duration of the recording. In such a case, however, the problem of "cross-talk" between these closely arranged oblique tracks arises in the reproduction mode wherein the processed color video signal is read from the oblique tracks on the magnetic tape. This problem of cross-talk can be solved by providing the two rotary magnetic heads, which form the oblique tracks alternatively, with different azimuth angles so that a substantial azimuth loss is obtained in cross-talk components derived from the adjacent oblique tracks, and in addition, by causing the chrominance signal to be subjected to appropriate circuit treatments before being recorded on the magnetic tape and after being read from the magnetic tape.

When high density recording of the processed color video signal is effected as described above, the transport speed of the magnetic tape is necessarily quite low, and the desired relative velocity between the magnetic tape and the rotary magnetic heads is maintained by the rotation of the latter. Thus, the relative velocity between the magnetic tape and the stationary magnetic head, which records the audio signal in the audio track, is also quite low, with the result that the quality of the recorded audio signal is deteriorated.

It has been proposed that the audio signal be frequency-modulated and then mixed with the processed color video signal to provide a mixed signal supplied to the rotary magnetic heads for recording such mixed signal in the oblique tracks so as to prevent deteriorations in the quality of the recorded audio signal due to the low transport spread of the magnetic tape. In such recording system for recording a mixed signal, it is required that an arrangement be provided for eliminating substantially a beat that may appear in a reproduced audio signal as a result of cross-talk in respect to the frequency-modulated audio signal included in the mixed signals recorded in each two adjacent oblique tracks.

In the recording system wherein the frequency-modulated audio signal is recorded, together with the processed color video signal, in the oblique tracks on the magnetic tape, as shown in FIG. 1 in which the abscissa represents the frequency F and the ordinate represents the level L, a frequency-modulated audio signal Af which is obtained by frequency-modulating a carrier having a predetermined frequency by an original audio signal is arranged so as to appear in the relatively narrow space between the upper boundary portion of the frequency band of a frequency-converted chrominance signal Cc and the lower boundary portion of the frequency and of the lower side band of a frequency-modulated luminance signal Yf. A mixed signal which contains the frequency-modulated audio signal Af and a processed color video signal composed of the frequency-converted chrominance signal Cc and the frequency-modulated luminance signal Yf is supplied to the rotary magnetic heads and thereby recorded in the oblique tracks on the magnetic tape.

In such a case, a carrier frequency Fa of the frequency-modulated audio signal Af is selected to be, for example, 1.5 KHz and the width of the frequency deviation range thereof is determined to be, for example, 100 to 150 kHz. The frequency-modulated luminance signal Yf has a the frequency deviation range such that the leading edge of the synchronous signal portion of a luminance signal Y separated from an original color television signal corresponds to a frequency Fs of, for example, 4.2 MHz, while the white peak (the maximum amplitude) of the luminance signal Y corresponds to a frequency Fp of, for example, 5.4 MHz. The frequency-converted chrominance signal Cc is formed to have a color subcarrier frequency Fc of, for example, about 743 kHz. Further, the level of the frequency-modulated audio signal Af is set to be lower than the level of the frequency-converted chrominance signal Cd, which is lower than the level of the frequency-modulated luminance signal Yf.

When the above mentioned recording system is used for recording wherein the frequency-modulated audio signal in the oblique tracks on the magnetic tape together with the processed color video signal composed of the frequency-converted chrominance signal and the frequency-modulated luminance signal, deterioration of, the recorded audio signal due to the low transport speed of the magnetic tape is substantially avoided. However, in the case where two-channel audio signals such as left and right channel signals forming a stereophonic audio signal are recorded with the described recording system, two carriers having their respective frequencies spaced from each other by, for example, 150 kHz, are frequency-modulated by these audio signals, respectively, so as to produce two individual frequency-modulated audio signals, each of which has the width of the frequency deviation range determined to be, for example, 100 to 150 kHz, and which occupy an expanded frequency band between the frequency bands of the frequency-converted chrominance signal and frequency-modulated luminance signal. Consequently, the side bands of the frequency-converted chrominance signal and the frequency-modulated luminance signal are suppressed or narrowed to provide space for the expanded frequency band of the two frequency-modulated audio signals, so that the quality of the reproduced picture obtained in accordance with reproduced chrominance and luminance signals is deteriorated. Conversely, if the audio frequency band between the frequency bands of the frequency-converted chrominance signal and frequency-modulated luminance signal is restricted so as not to suppress the side bands of the frequency-converted chrominance signal and the frequency-modulated luminance signal, it is difficult to record two-channel audio signals in such restricted band.

OBJECTS AND SUMMARY OF THE INVENTION

Accordingly, it is an object of the present invention to provide a magnetic recording apparatus in which one or more audio signals are converted into respective frequency-modulated audio signals and recorded in oblique record tracks on a magnetic tape together with a frequency-converted chrominance signal and a frequency-modulated luminance signal in such a manner that each frequency-modulated audio signal is located in an audio frequency band arranged between the frequency bands of the frequency-converted chrominanse signal and the frequency-modulated luminance signal, and in which two-channel audio signals can be recorded with such a relatively narrow audio frequency band as to substantially, avoid any adverse influence upon the frequency bands of the frequency-converted chrominance single and the frequency-modulated luminance signal.

Another object of the present invention is to provide a magnetic recording apparatus for recording audio and video signals, as aforesaid and which can record two-channel audio signals without expanding substantially the width of the audio frequency band as compared with that required for recording a single-channel audio signal.

Still another object of the present invention is to provide a magnetic recording apparatus for recording audio and video signals, as aforesaid, and which can record two-channel audio signals in the form of a single frequency-modulated audio signal located in the audio frequency band.

A further object of the present invention is to provide a magnetic recording apparatus for recording audio and video signals, as aforesaid, and which can record two-channel audio signals so that at least one of the two-channel audio signals can be easily reproduced when the magnetic tape on which the two-channel audio signals are recorded in the form of frequency-modulated audio signals is applied to a reproducing apparatus which is operative to reproduce a single-channel audio signal.

A further object of the present invention is to provide a magnetic reproducing apparatus for reproducing two-channel audio signals recorded in oblique record tracks on a magnetic tape, together with a frequency-converted chrominance signal and a frequency-modulated luminance signal, and in which the reproduced audio is in the form of a single frequency-modulated audio signal located in and audio frequency band arranged between the frequency bands of the frequency-converted chrominance signal and the frequency-modulated luminance signal.

A still further object of the present invention is to provide a magnetic recording and reproducing apparatus for reproducing audio and video signal, as aforesaid, in which two-channel audio signals can be recorded in the form of a single frequency-modulated audio signal located in an audio frequency band between, and without substantially exerting an adverse influence upon, the frequency bands of the frequency-converted chrominance signal and the frequency-modulated luminance signal, and in which the two-channel audio signals can be reproduced from the magnetic tape on which the single frequency-modulated audio signal is recorded.

According to an aspect of the present invention, there is provided an apparatus for magnetically recording two-channel audio signals, together with a color video signal, in successive record tracks formed on a magnetic tape by a rotary magnetic head to extend obliquely with respect to the running direction of the magnetic tape, the apparatus comprising; a luminance signal processing circuit for generating a frequency-modulated luminance signal obtained by frequency-modulating a video carrier by a luminance signal separated from a color television signal; a chrominance signal processing circuit for generating a frequency-converted chrominance signal obtained by frequency-converting a chrominance signal separated from the color television signal to a frequency band lower than the frequency band of the frequency-modulated luminance signal; an audio signal processing circuit for generating a frequency-modulated audio signal including first segments obtained by frequency-modulating an audio carrier in response to one of the two-channel audio signals and second segments obtained by frequency-modulating the audio carrier in response to the other of the two-channel audio signals and being arranged alternately in succession at predetermined intervals; and a signal mixing circuit for producing a mixed signal in which the frequency-modulated audio signal is located between the frequency bands of the frequency-modulated luminance signal and the frequency-converted chrominance signal and supplying the mixed signal to the rotary magnetic head.

Further, there is also provided an apparatus for magnetically reproducing two-channel audio signals and a color video signal from a magnetic tape on which the two-channel audio signals are recorded as a frequency-modulated audio signal including first segments obtained by frequency-modulating an audio carrier in response to one of the two-channel audio signals and second segments of a frequency-modulated signal obtained by frequency-modulating the audio carrier in response to the other of the two-channel audio signals and being arranged alternately in succession at predetermined intervals, together with the color video signal composed of a frequency-modulated luminance signal and a frequency-converted chrominance signal, in successive record tracks extending obliquely with respect to the running direction of the magnetic tape, the apparatus comprising; a video signal reproducing circuit for reproducing luminance and chorminance signals from the frequency-modulated luminance signal and frequency-converted chrominance signal obtained from the magnetic tape; an audio signal demodulating circuit for frequency-demodulating the frequency-modulated audio signal obtained from the magnetic tape to produce demodulated outputs of the first and second segments alternately at the predetermined intervals; and an audio signal separating circuit for separating from each other the demodulated output of the first segments and the demodulated output of the second segments, and for producing the two-channel audio signals in accordance with the separated demodulated outputs of the first and second segments, respectively.

In the apparatus thus constituted in accordance with the present invention, the two-channel audio signals are converted into a single frequency-modulated audio signal and located in an audio frequency band arranged between the frequency bands of the frequency-modulated luminance and frequency-converted chrominance signals to be recorded in the successive oblique record tracks formed by the rotary magnetic head on he magnetic tape together with the frequency-modulated luminance and frequency-converted chrominance signals, and then, in the reproducing mode, reproduced two-channel audio signals are obtained independently, along with reproduced luminance and chrominance signals constituting a reproduced color video signal. Therefore, in addition to avoiding deterioration of the two-channel audio signals recorded on the magnetic tape that would otherwise result from the low transport speed of the magnetic tape, the following advantage is obtained. Since two two-channel audio signals are recorded and then reproduced without expanding substantially the width of the audio frequency band arranged between the frequency bands of the frequency-modulated luminance and the frequency-converted chrominance signals beyond that provided for recording a single-audio signal, the need to narrow or suppress the side band of each of the frequency-modulated luminance signal and the frequency-converted chrominance signal is avoided so that the quality of a reproduced picture obtained in accordance with the reproduced color video signal is not deteriorated.

Further, with the magnetic recording apparatus according to the present invention, the two-channel audio signals are recorded on the magnetic tape in such a manner that at least one of the two-channel audio signals can be easily reproduced when such a magnetic tape is applied to a reproducing apparatus which is operative to reproduce a single-channel audio signal. This means that the magnetic recording apparatus according to the present invention is operative to be compatible with the reproducing apparatus with which a single-channel audio signal can be reproduced and accordingly is very convenient in actual use.

The above, and other objects, features and advantages of the present invention will be apparent from the following detailed description which is to be read in conjunction with the accompanying drawings.

BRIEF DESCRIPTION OF THE DRAWINGS

FIGS. 4A to 4H are diagrams showing waveforms and signal sequences to which references are made in explaining the operation of the recording and reproducing apparatus shwon in FIGS. 2 and 3; and FIG. 5 is a block diagram showing a portion of another embodiment of a magnetic recording apparatus according to the present invention.

DESCRIPTION OF THE PREFERRED EMBODIMENTS

Figures 1, 2:
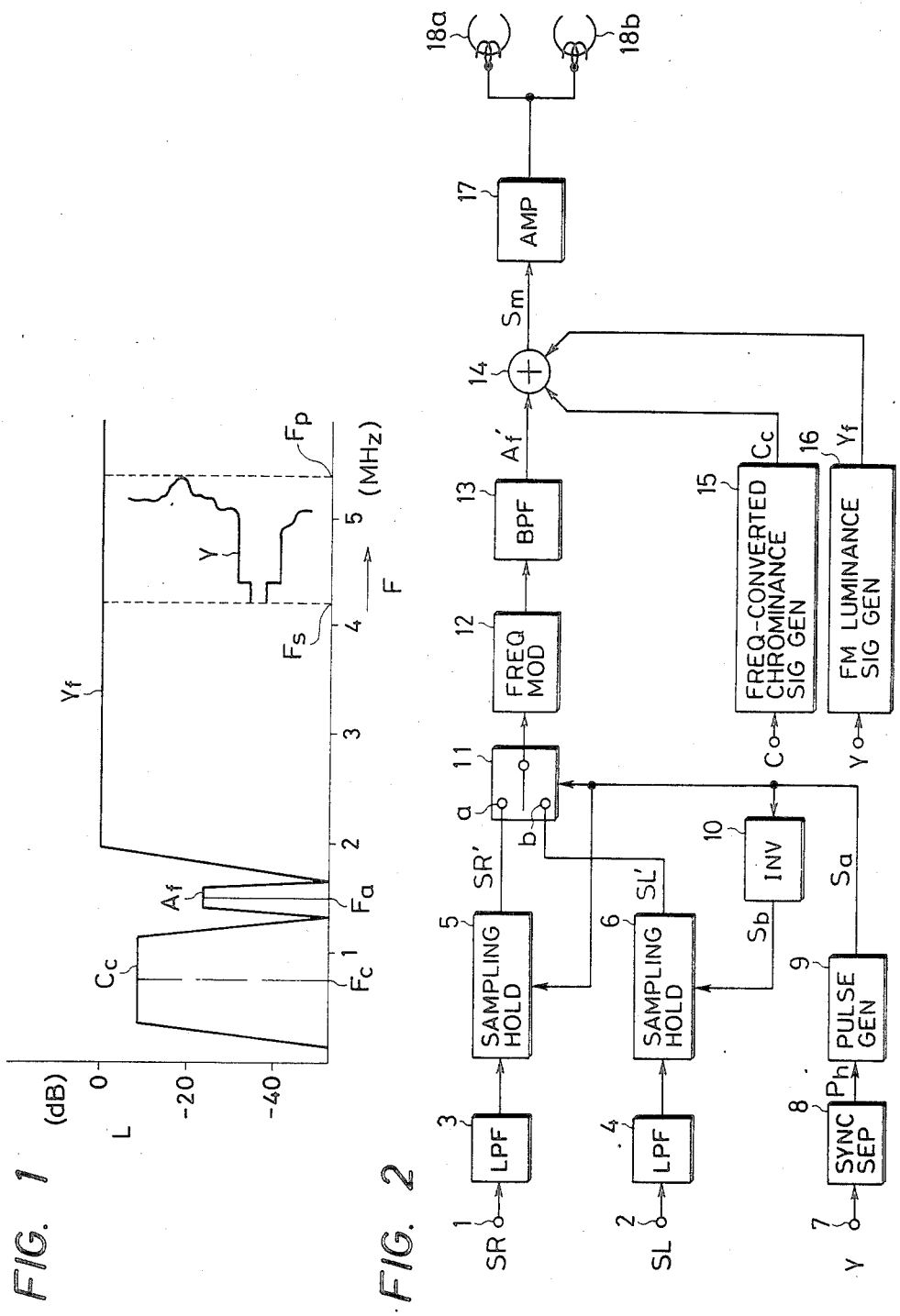
FIG. 1 is a diagram showing the frequency spectrum of a frequency-modulated audio signal, a frequency-modulated luminance signal and a frequency-converted chrominance signal, and to which reference is made in explaining the recording of audio and color video signals in oblique record tracks on a magnetic tape.
FIG. 2 is a block diagram showing one embodiment of magnetic recording apparatus according to the present invention.

Referring initially to FIG. 2 it will be seen that a magnetic recording apparatus according to an embodiment of the present invention, is operative to record a stereophonic audio signal composed of left and right channel signals $S_R$ and $S_L$ together with a color video signal on a magnetic tape.

The right channel signal SR and left channel signal SL of the stereophonic audio signal are supplied to audio signal input terminals 1 and 2, respectively. The right channel signal SR is restricted or cut-of to have a frequency-band lower than the line or horizontal frequency of a television signal by a low pass filter 3 and then supplied to an input terminal of a sampling and hold circuit 5. Similarly, the left channel signal SL is restricted or cut-off to have a frequency-band lower than the line frequency of the television signal by a low pass filter 4 and then supplied to an input terminal of a sampling and hold circuit 6.

Further, a luminance signal Y (FIG. 4A) separated from a color television signal is supplied through a luminance signal input terminal 7 to a synchronizing signal separating circuit 8 and a line horizontal synchronizing pulse Ph, (FIG. 4B) is obtained from the synchronous signal separating circuit 8 in synchronism with a line synchronizing signal Hp in the luminance signal Y. The horizontal synchronizing pulse Ph is supplied to a pulse generating circuit 9 and a pulse signal Sa (FIG. 4C) appearing in synchronism with the Fh of the pulse Ph with a frequency 2 Fh which is twice as high as the frequency of the line horizontal synchronizing pulse Ph of the luminance signal Y is obtained from the pulse generating circuit 9. This pulse signal Sa is formed to have the duty factor of fifty percent and to take a high level h and a low level l alternatively for durations each corresponding to a quarter of a line period Th of the luminance signal Y. The pulse signal Sa thus obtained is supplied to a control terminal of the sampling and hold circuit 5 and to an inverter 10. The inverter 10 produces a pulse signal Sb which is inverted in level in relation to the pulse signal Sa, as shown in FIG. 4D, and supplies the same to a control terminal of the sampling and hold circuit 6.

In the sampling and hold circuit 5, the level of the right channel signal SR which has been subjected to the frequency-band restriction by the low pass filter 3 is sampled at the time of each rising edge of the pulse signal Sa, as indicated by an arrow in FIG. 4C, and each sampled level is held for a duration corresponding to a period between two contiguous rising edges of the pulse signal Sa, that is, a period of a half of the line period Th, so that a sampled and held output SR' concerning the right channel signal SR is obtained at an output terminal of the sampling and hold circuit 5 to be supplied to a contact a of a switch 11. Similarly, in the sampling and hold circuit 6, the level of the left channel signal SL which has been subjected to the frequency-band restriction by the low pass filter 4 is sampled at the time of each rising edge of the pulse signal Sb, as indicated by an arrow in FIG. 4D, and each sampled level is held for a duration corresponding to a period between two contiguous rising edges of the pulse signal Sb, that is, a period of a half of the line period Th, so that a sampled and held output SL' concerning the left channel signal SL is obtained at an output terminal of the sampling and hold circuit 6 to be supplied to a contact b of the switch 11. Because each of the right and left channel signals SR and SL is subjected to the sampling and hold operation with the pulse signal Sa or Sb having the frequency 2 Fh as a sampling signal in the manner mentioned above, the right and left channel signals SR and SL are restricted to have a frequency-band lower than the line frequency Fh in the low pass filters 3 and 4, respectively.

A control terminal of the switch 11 is supplied with the pulse signal Sa from the pulse generating circuit 9 and a movable contact of the switch 11 is controlled to be connected to the contact a when the pulse signal Sa takes the high level h and to the contact b when the pulse signal Sa takes the low level 1. As a result of this, the sampled and held output SR' concerning the right channel signal SR and the sampled and held output SL' concerning the left channel signal SL are derived from the switch 11 alternately at successive periods each corresponding to a quarter of the line period Th, and then supplied to a frequency-modulating circuit 12.

In the frequency-modulating circuit 12, an audio carrier having the frequency Fa' of, for example, 1.5 MHz is frequency-modulated by the sampled and held outputs SR' and SL' successively with a frequency deviation range of, for example, about ±100 kHz, so that a frequency-modulated audio signal Af' (FIG. 4E) is obtained from an output terminal of the frequency-modulating circuit 12 through a band pass filter 13 and is supplied to an adder or mixing circuit 14. The frequency-modulated audio signal Af' is composed of segments RF resulting from the frequency-modulation of the audio carrier by the sampled and held outputs SR' and segments LF resulting from the frequency-modulation of the audio carrier by the sampled and held outputs SL', which appear alternately at successive periods each corresponding to a quarter of the line period Th. The signal Af' has a level and a frequency band extending above and below the carrier frequency Fa' of 1.5 MHz similar to those of the frequency-modulated audio signal Af shown in FIG. 1.

Continuing with the circuit arrangement of FIG. 2, a chrominance signal C separated from the color television signal from which the luminance signal Y is separated is supplied to a frequency-converted chrominance signal generating circuit 15 for processing therein, while the luminance signal Y is supplied also to a frequency-modulated luminance signal generating circuit for processing therein. The frequency-modulated luminance signal generating circuit 16 is operative to frequency-modulate a video carrier by the luminance signal Y and produce the frequency-modulated luminance signal Yf as aforementioned and shown in FIG. 1, and the frequency-converted chrominance signal generating circuit 15 is operative to frequency-convert the chrominance signal C to the frequency band lower than the frequency band of the frequency-modulated luminance signal Yf and to produce the frequency-converted chrominance signal Cc as aforementioned and shown in FIG. 1. The frequency-modulated luminance signal Yf and frequency-converted chrominance signal Cc are supplied to respective inputs of the mixing circuit 14 which receives the frequency-modulated audio signal Af' from band pass filter 13.

In the mixing circuit 14, the frequency-modulated audio signal Af' is mixed with the frequency-modulated luminance signal Yf and the frequency-converted chrominance signal Cc so as to provide a mixed signal Sm in which audio signal $A_f$ is located in a relatively narrow frequency band arranged between the frequency bands of the frequency-modulated luminance signal Yf and the frequency-converted chrominance signal Cc, without suppressing substantially the side band of either the frequency-modulated luminance signal Yf or the frequency-converted chrominance signal Cc. The mixed signal Sm obtained from the mixing circuit 14 is supplied through an amplifier 17 to a pair of rotary magnetic heads 18a and 18b, which have different azimuth angles and are rotated to alternately scan a magnetic tape at high relative velocity forming successive oblique record tracks in which mixed signal Sm is recorded on the magnetic tape.

Accordingly, the right channel signal SR and the left channel signal SL are recorded in the form of the frequency-modulated audio signal Af' in the successive oblique record tracks formed by the rotary magnetic heads 18a and 18b on the magnetic tape, together with the frequency-modulated luminance signal Yf and the frequency-converted chrominance signal Cc, without exerting substantially any adverse influence upon the frequency bands of the frequency-modulated luminance signal Yf and the frequency-converted chrominance signal Cc.

Figure 3:
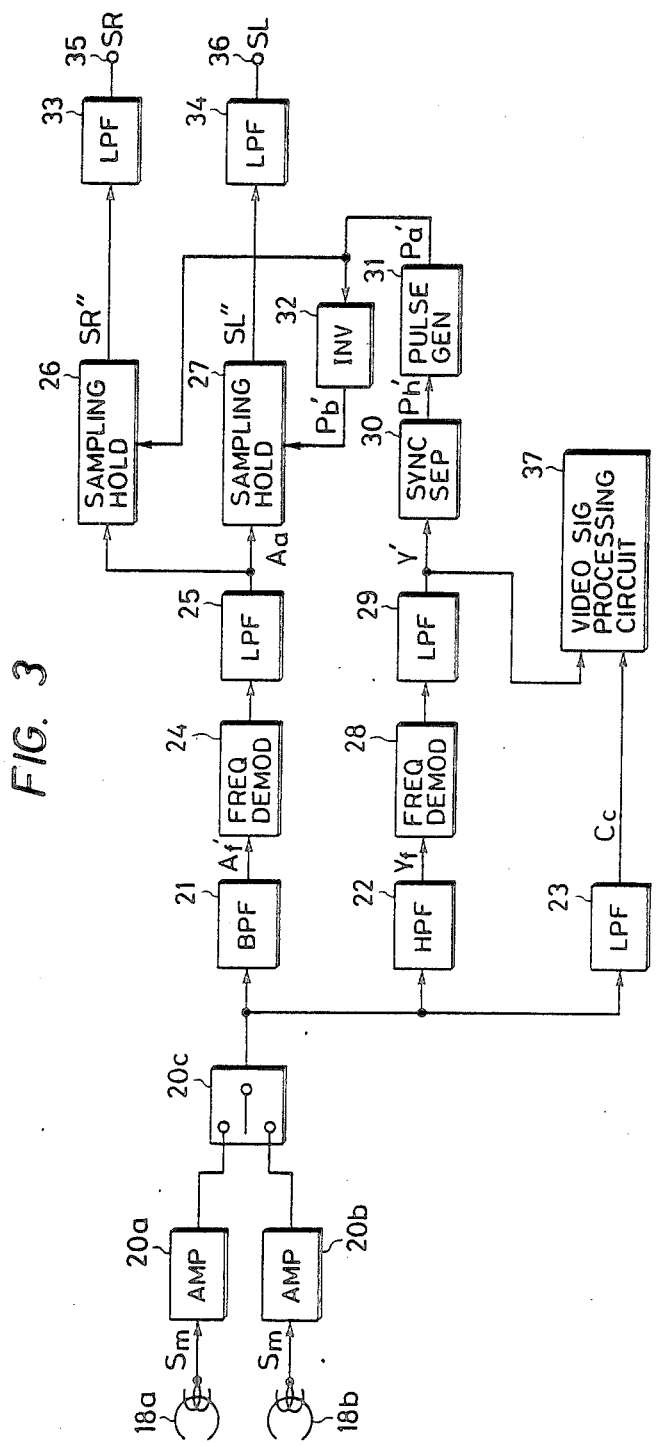
FIG. 3 is a block diagram showing one embodiment of magnetic reproducing apparatus according to the present invention.

FIG. 3 shows an example of the magnetic reproducing apparatus according to the present invention, which is adapted to reproduce the right channel signal SR and the left channel signal SL, in addition to the luminance signal Y and the chrominance signal C, from the magnetic tape on which has been recorded the mixed signal Sm, which contains the frequency-modulated luminance signal Yf, the frequency-converted chrominance signal Cc and the frequency-modulated audio signal Af' located in the frequency band arranged between the frequency bands of the frequency-modulated luminance signal Yf and the frequency-converted chrominance signal Cc, for example, by the recording apparatus shown in FIG. 2.

In the apparatus FIG. 3, the rotary magnetic heads 18a and 18b are provided as recording/reproducing heads to be used also in the recording apparatus shown in FIG. 2 and such heads are arranged to scan alternately the oblique record tracks on the magnetic tape to read the mixed signal Sm therefrom in such a manner that each of the oblique record tracks is traced by one of the rotary magnetic heads 18a and 18b with the azimuth angle corresponding to that of the rotary magnetic head used for forming the oblique record track being traced, so that cross-talk components reproduced from adjacent tracks and appearing in the outputs of the rotary magnetic heads 18a and 18b are suppressed.

The segments of the mixed signal Sm read from the respective oblique record tracks on the magnetic tape by the rotary magnetic heads 18a and 18b, respectively, are supplied through amplifiers 20a and 20b to a switch 20c and are derived alternately therefrom to form the continuous mixed signal Sm. The mixed signal Sm from the switch 20c is supplied to a band pass filter 21, a high pass filter 22 and a low pass filter 23. The frequency-modulated audio signal Af' in the mixed signal Sm is extracted by the band pass filter 21 and supplied to a frequency-demodulating circuit 24 to be frequency-demodulated therein. As a result of this frequency-demodulation, a reproduced audio signal Aa is obtained from an output terminal of the frequency-demodulating circuit 24 through a low pass filter 25 to be supplied to two sampling and hold circuits 26 and 27. This reproduced audio signal Aa contains the segments of the sampled and held outputs Sr' concerning the right channel signal SR and the segments of the sampled and held outputs SL' concerning the left channel signal SL which appear alternately in succession at periods corresponding to a quarter of the line period Th, as shown in FIG. 4F.

The frequency-modulated luminance signal Yf in the mixed signal Sm from the switch 20c is extracted through the high pass filter 22 and supplied to a frequency-demodulating circuit 28 to be frequency-demodulated therein. As a result, a reproduced luminance signal Y' is obtained from an output terminal of the frequency-demodulating circuit 28 through a low pass filter 29 to be supplied to a synchronizing signal separating circuit 30. The synchronizing signal separating circuit 30 provides a line synchronizing pulse Ph' is synchronism with the horizontal synchronizing signal in the reproduced luminance signal Y', and corresponds to the horizontal synchronizing pulse Ph shown in FIG. 4B. The horizontal synchronizing pulse Ph' is supplied to a pulse generating circuit 31 and a pulse signal Pa' appearing in synchronism with the horizontal synchronizing pulse Ph' with the frequency 2 Fh is obtained from the pulse generating circuit 31. This pulse signal Pa' is formed to have a duty cycle of fifty percent and to take high and low levels alternately at periods each corresponding to a quarter of the line period Th in the same manner as the pulse signal Sa shown in FIG. 4C. The pulse signal Pa' thus obtained is supplied to a control terminal of the sampling and hold circuit 26 and to an inverter 32. The inverter 32 produces a pulse signal Pb' which is inverted in level in relation to the pulse signal Pa' and formed in the same manner as the pulse signal Sb shown in FIG. 4D and supplies the same to a control terminal of the sampling and hold circuit 27.

In the sampling and hold circuit 26, a segment SR' in the reproduced audio signal Aa is sampled at a time corresponding to each rising edge of the pulse signal Pa' which, in turn, corresponds to a rising edge of the pulse signal Sa indicated by the arrow in FIG. 4C, and each sampled segment SR' is held for a duration corresponding to a period between two contiguous rising edges of the pulse signal Pa', that is, a half of the line period Th, so that a sampled and held output SR" concerning the sampled and held segment SR', as shown in FIG. 4G, is obtained at an output terminal of the sampling and hold circuit 26. Similarly, in the sampling and hold circuit 27, a segment SL' in the reproduce audio signal Aa is sampled at a time corresponding to each rising edge of the pulse signal Pb' which in turn corresponds to a rising edge of the pulse signal Sb indicated by the the arrow in FIG. 4D, and each samples segment SL' is held for a duration corresponding to a period between two contiguous rising edges of the pulse signal Pb', so that a sampled and held segment SL" concerning the sampled and held output SL', as shown in FIG. 4H, is obtained at an output terminal of the sampling and hold circuit 27.

The sampled and held outputs SR" and SL" are supplied to low pass filters 33 and 34, respectively. The low pass filter 33 produces a reproduced right channel signal SR having a frequency band extending in the range lower than the line or horizontal frequency Fh in response to the sampled and held outputs SR" supplied thereto, and the reproduced right channel signal SR thus obtained from the low pass filter 33 is supplied to an audio signal output terminal 35. Similarly, the low pass filter 34 produces a reproduced left channel signal SL having a frequency band extending in the range lower than the line frequency Fh in response to the sampled and held outputs SL" supplied thereto, and the reproduced right channel signal SL thus obtained from the low pass filter 34 is supplied to an audio signal output terminal 36.

Further, the frequency-converted chrominance signal Cc in the mixed signal Sm from the switch 20c is extracted through the low pass filter 23 and supplied to a video signal processing circuit 37, together with the reproduced luminance signal Y' obtained from the low pass filter 29. In the video signal processing circuit 37, the frequency-converted chrominance signal Cc is frequency-converted again to the original frequency band so as to be reproduced chrominance signal, and then the reproduced luminance signal Y' and the reproduced chrominance signal are processed to produce an appropriate color video signal.

In the manner described above, with the reproducing apparatus according to the present invention, the right channel signal SR and the left channel signal SL constituting the stereophonic audio signal are reproduced independently, in addition to the color video signal, from the magnetic tape on which the frequency-modulated audio signal Af' has been recorded, together with the frequency-modulated luminance signal Yf and the frequency-converted chrominance signal Cc, in the oblique record tracks by the recording apparatus shown in FIG. 2.

In the recording apparatus shown in FIG. 2, the right channel signal Sr and the left channel signal Sl are subjected to the sampling and hold operations by the sampling and hold circuit 5 and 6, respectively, and then processed to be recorded on the magnetic tape. Consequently, in the reproducing apparatus shown in FIG. 3, the sampling operation in the sampling and hold circuit 26 can be performed at any time within a period equal to a quarter of the line period Th corresponding to the duration of each segment of the sampled and held output SR' in the reproduced audio signal Aa. Similarly, to the sampling operation in the sampling and hold circuit 27 can be performed at any time within a period equal to a quarter of the line period Th corresponding to the duration of each segment of the sampled and held output SL' in the reproduced audio signal Aa. Therefore, preciseness is not required in timing the sampling operations performed for reproducing the right channel signal SR and the left channel signal Sl.

However, it is not necessary to provide the sampling and hold circuits 5 and 6 in a recording apparatus according to the present invention. Thus, as shown on FIG. 5, it is possible to have an arrangement wherein the right channel signal SR from the audio signal input terminal 1 and the left channel signal SL from the audio signal input terminal 2 are supplied directly through filters 3 and 4, respectively, to inputs of the switch 11 which is controlled by the pulse signal Sa. The signals SR and SL are derived alternately from switch 11 at successive periods each, corresponding to a quarter of the line period Th and are supplied from switch 11 to the frequency-modulating circuit 12, as shown in FIG. 5. Therefore, segments of a frequency-modulated signal resulting from the frequency-modulation of the audio carrier by the right channel signal SR and segments of a frequency-modulated signal resulting from the frequency-modulation of the audio carrier by the left channel signal SL are obtained alternately from the frequency-modulating circuit 12.

Further, although the sampling rate in each of the sampling and hold circuits 5 and 6 in the recording apparatus shown in FIG. 2 is selected to be a half of the line period Th, it is to be understood that the sampling and hold circuits 5 and 6 are not limited to such sampling rates, and that various appropriate rates may be used for the sampling operation in each of the sampling and hold circuits 5 and 6.

What is claimed is:

1. An apparatus for magnetically recording a color video signal composed of luminance and chrominance signal components and two-channel audio signals on a magnetic tape, comprising:
   rotary head means for scanning successive oblique tracks on the magnetic tape;
   means for frequency-modulating a carrier by said luminance signal component to provide a frequency-modulated luminance signal;
   means for frequency-converting said chrominance signal component to provide a frequency-converted chrominance signal in a frequency band lower than the frequency band of said frequency-modulated luminance signal;
   audio signal processing means receiving said two-channel audio signals and alternately frequency-modulating an audio carrier therewith to provide a frequency-modulated audio signal consisting essentially of first and second time-multiplexed segments of predetermined duration corresponding to said audio carrier frequency-modulated by said two-channel audio signals, respectively, and havin a frequency band located substantially between the frequency bands of said frequency-modulated luminance signal and said frequency-converted chrominance signal, respectively;
   signal mixing means for mixing said frequency-modulated audio signal with said frequency-modulated luminance signal and said frequency-converted chrominance signal to provide a mixed signal; and
   means for applying said mixed signal to said rotary head means for recording in the successively scanned oblique tracks.

2. An apparatus according to claim 1; wherein said audio signal processing means comprises first sampling and hold means for sampling one of said two-channel audio signals at first periodic times and holding each sampled value of said one audio signal for a duration corresponding to an interval between said first periodic times so as to provide a first sampled and held output, second sampling and hold means for sampling the other of said two-channel audio signals at second periodic times occurring between said first periodic times and holding each sampled value of said other audio signal for a duration corresponding to an interval between said second periodic times so as to provide a second sampled and held output, combining means for combining said first and second sampled and held outputs so as to form a substantially continuous signal containing segments of said first and second sampled and held outputs of said predetermined duration arranged alternately in succession, and frequency-modulating means for frequency-modulating said audio carrier by said substantially continuous signal.

3. An apparatus according to claim 2; wherein said combining means includes switching means for extracting the segments of said first sampled and held output and the segments of said second sampled and held output alternately at intervals equal to said predetermined duration from said first and second sampled and held outputs.

4. An apparatus according to claim 1; wherein said audio signal processing emans comprises switching means for alternately extracting segments of one of said two-channel audio signals and segments of the other of said two-channel audio signals at intervals corresponding to said predetermined duration from said two-channel audio signals, and frequency-modulating means for frequency-modulating said audio carrier by said segments of said one and said other of the audio signals extracted by said switching means.

5. An apparatus for magnetically reproducing, from successive oblique tracks on a magnetic tape, two-channel audio signals and luminance and chrominance signal components of a color video signal, said luminance and chrominance signal components being recorded in each of said tracks as a frequency-modulated luminance signal and a frequency-converted chrominance signal in a band lower than the frequency band of said frequency-modulated luminance signal, and two-channel audio signals being recorded as first and second time-multiplexed segments of a frequency-modulated audio signal with said first and second segments corresponding to an audio carrier frequency-multiplied by said two-channel audio signals, respectively, for respective predetermined durations, the apparatus comprising:
   rotary head means for scanning said oblique tracks in succession and reproducing said frequency-modulated luminance and frequency-converted chrominance signals and said frequency-modulated audio signal from the track being scanned;
   video signal processing means for providing luminance and chrominance signal components from the frequency-modulated luminance signal and frequency-converted chrominance signal reproduced by said head means from the magnetic tape;
   audio signal demodulating means for alternately frequency-demodulating said first and second segments of the frequency-modulated audio signal reproduced by said head means; and
   audio signal separating means for separating said demodulated first and second segments from each other and for producing said two-channel audio signals from the separated demodulated first and second segments, respectively.

6. An apparatus according to claim 5; wherein said audio signal separating means includes first sampling and hold means for sampling the demodulated first segments at first periodic times and holding each sampled value for a duration corresponding substantially to an interval between said first periodic times, second sampling and hold means for sampling the demodulated second segments at second periodic times occurring between said first periodic times and holding each sampled value for a duration corresponding substantially to an interval between said second periodic times, first filter means for passing therethrough the sampled and held value from said first sampling and hold means, and second filter mean for passing therethrough the sampled and held value from said second sampling and hold means.

7. An apparatus for magnetically recording and reproducing on magnetic tape a color video signal composed of luminance and chrominance signal components and two-channel audio signals, comprising:

rotary head means for scanning successive oblique tracks on the magnetic tape;

a recording section including means for frequency-modulating a carrier by said luminance signal component to provide a frequency-modulated luminance signal, means for frequency-converting said chrominance signal component to provide a frequency-converted chrominance signal in a frequency band lower than the frequency band of said frequency-modulated luminance signal, audio signal processing means receiving said two-channel audio signals and alternately frequency-modulating an audio carrier therewith to provide a frequency-modulated audio signal consisting essentially of first and second time-multiplexed segments of predetermind duration corresponding to said audio carrier frequency-modulated by said two-channel audio signals, respectively, and having a frequency band located substantially between the frequency bands of said frequency-modulated luminance signal and said frequency-converted chrominance signal, respectively, signal mixing means for mixing said frequency- modulated audio signal with said frequency-modulated luminance signal and said frequency-converted chrominance signal to provide a mixed signal, means for applying said mixed signal to said rotary head means for recording in the successively scanned oblique tracks; and a reproducing section including means for deriving said mixed signal reproduced by said rotary head means from the successive tracks scanned thereby in a reproducing mode, video signal processing means for providing luminance and chrominance signal components from the frequency-modulated luminance signal and the frequency-converted chrominance signal in the mixed signal reproduced by said head means from the magnetic tape, audio signal demodulating means for altenately frequency-demodulating said first and second segments of the frequency-modulated audio signal in the mixed signal reproduced by said head means, and audio signal separating means for separating said demodulated first and second segments from each other and for producing said two-channel audio signals from the separated demodulated first and second segments, respectively.

* * * * *